United States Patent
He et al.

(10) Patent No.: US 7,546,761 B2
(45) Date of Patent: Jun. 16, 2009

(54) DIESEL OXIDATION CATALYST (DOC) TEMPERATURE SENSOR RATIONALITY DIAGNOSTIC

(75) Inventors: Chuan He, Northville, MI (US); Richard B. Jess, Haslett, MI (US); Jay Tolsma, Grand Ledge, MI (US); GuoJun Shi, Canton, MI (US); Jose L. DeLeon, Madison Heights, MI (US); Kouji Sakumoto, Commerce Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 340 days.

(21) Appl. No.: 11/385,045

(22) Filed: Mar. 17, 2006
(Under 37 CFR 1.47)

(65) Prior Publication Data
US 2008/0083271 A1   Apr. 10, 2008

Related U.S. Application Data

(60) Provisional application No. 60/670,526, filed on Apr. 12, 2005.

(51) Int. Cl.
*G01M 15/10* (2006.01)
(52) U.S. Cl. .................................. 73/114.69
(58) Field of Classification Search ............. 73/114.69, 73/114.71, 114.72, 114.73, 114.74, 114.75
See application file for complete search history.

(56) References Cited

U.S. PATENT DOCUMENTS

| | | | | |
|---|---|---|---|---|
| 5,428,956 A * | 7/1995 | Maus et al. | | 60/277 |
| 5,747,668 A * | 5/1998 | Cianciara | | 73/1.06 |
| 6,085,575 A * | 7/2000 | Wienand et al. | | 73/23.32 |
| 6,381,953 B1 * | 5/2002 | Glugla et al. | | 60/284 |
| 6,964,194 B2 * | 11/2005 | Busch et al. | | 73/118.1 |
| 7,021,129 B2 * | 4/2006 | Busch et al. | | 73/118.1 |
| 2002/0116917 A1 * | 8/2002 | Glugla et al. | | 60/285 |
| 2004/0129065 A1 * | 7/2004 | Plote et al. | | 73/117.3 |
| 2004/0255655 A1 * | 12/2004 | Busch et al. | | 73/118.1 |
| 2005/0102076 A1 * | 5/2005 | Kariya et al. | | 701/34 |
| 2005/0145024 A1 * | 7/2005 | Busch et al. | | 73/118.1 |
| 2005/0279156 A1 * | 12/2005 | He et al. | | 73/23.31 |
| 2007/0047616 A1 * | 3/2007 | Izumiura et al. | | 374/144 |

* cited by examiner

*Primary Examiner*—Eric S McCall

(57) ABSTRACT

A temperature sensor rationality control system for an exhaust treatment system having an oxidation catalyst includes an oxidation catalyst inlet temperature sensor that generates an inlet temperature signal and an oxidation catalyst outlet temperature sensor that generates an outlet temperature signal. A control module determines whether a difference based on the inlet temperature signal and the outlet temperature signal is below a difference threshold when an exhaust temperature is within a threshold range.

21 Claims, 2 Drawing Sheets

DIESEL OXIDATION CATALYST (DOC) TEMPERATURE SENSOR RATIONALITY DIAGNOSTIC

CROSS-REFERENCE TO RELATED APPLICATIONS

This application claims the benefit of U.S. Provisional Application No. 60/670,526, filed on Apr. 12, 2005. The disclosure of the above application is incorporated herein by reference.

FIELD OF THE INVENTION

The present invention relates to engine exhaust treatment systems, and more particularly to a temperature sensor rationality diagnostic for an exhaust treatment system including a diesel oxidation catalyst (DOC).

BACKGROUND OF THE INVENTION

Diesel engines are internal combustion engines that combust an air and fuel mixture reciprocally drive pistons slidably disposed within cylinders producing drive torque. Diesel engines typically have a higher efficiency than gasoline engines due to the increased compression ratio of the diesel combustion process and the higher energy density of diesel fuel. Consequently, diesel engines commonly achieve better gas mileage than equivalently sized gasoline engines. Vehicle manufacturers incorporate emission control devices into the exhaust treatment systems of diesel engines to reduce emissions.

An exemplary exhaust treatment device includes a diesel oxidation catalyst (DOC). A DOC is an exhaust flow through device that includes a honey-comb formed substrate having a large surface area coated with a catalyst layer. The catalyst layer includes precious metals including, but not limited to, platinum and palladium. As the exhaust flows over the catalyst layer, carbon monoxide, gaseous hydrocarbons and liquid hydrocarbon particles are oxidized to reduce emissions.

The DOC may be adversely affected when the temperature of the exhaust exceeds a threshold. Inlet and outlet temperature sensors are typically associated with the DOC to monitor exhaust temperatures. Proper functioning of the temperature sensors is required to enable the vehicle control system to monitor exhaust temperature. Because the temperature sensors work over a large operating range (e.g., −40° C. to 800° C.) it has traditionally been difficult to ensure accuracy over the entire range.

SUMMARY OF THE INVENTION

Accordingly, the present invention provides a temperature sensor rationality control system for an exhaust treatment system having an oxidation catalyst. The temperature sensor rationality control system includes an oxidation catalyst inlet temperature sensor that generates an inlet temperature signal and an oxidation catalyst outlet temperature sensor that generates an outlet temperature signal. A control module determines whether a difference based on the inlet temperature signal and the outlet temperature signal is below a difference threshold when an exhaust temperature is within a threshold range.

In other features, the exhaust temperature is greater than the first threshold temperature and is less than the second threshold temperature when a plurality of vehicle operating parameters are within respective threshold ranges. The vehicle operating parameters include engine running time, current fuel rate, exhaust mass flow, engine RPM, coolant temperature and no DPF regeneration occurring. The exhaust temperature is greater than the first threshold temperature and is less than the second threshold temperature when a plurality of vehicle operating parameters are within the respective threshold ranges for a threshold period of time.

In another feature, the exhaust temperature is calculated based on at least one of an engine RPM, a primary fuel rate, an injection timing, a turbo boost level, a post fuel rate and an exhaust gas recirculation (EGR) value.

In still other features, the difference is determined based on a delayed inlet temperature value. The delayed inlet temperature value is determined based on at least one of a calibration factor, a previous delayed inlet temperature value and the inlet temperature signal. The calibration factor is determined from a look-up table based on an exhaust flow rate and a fueling rate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
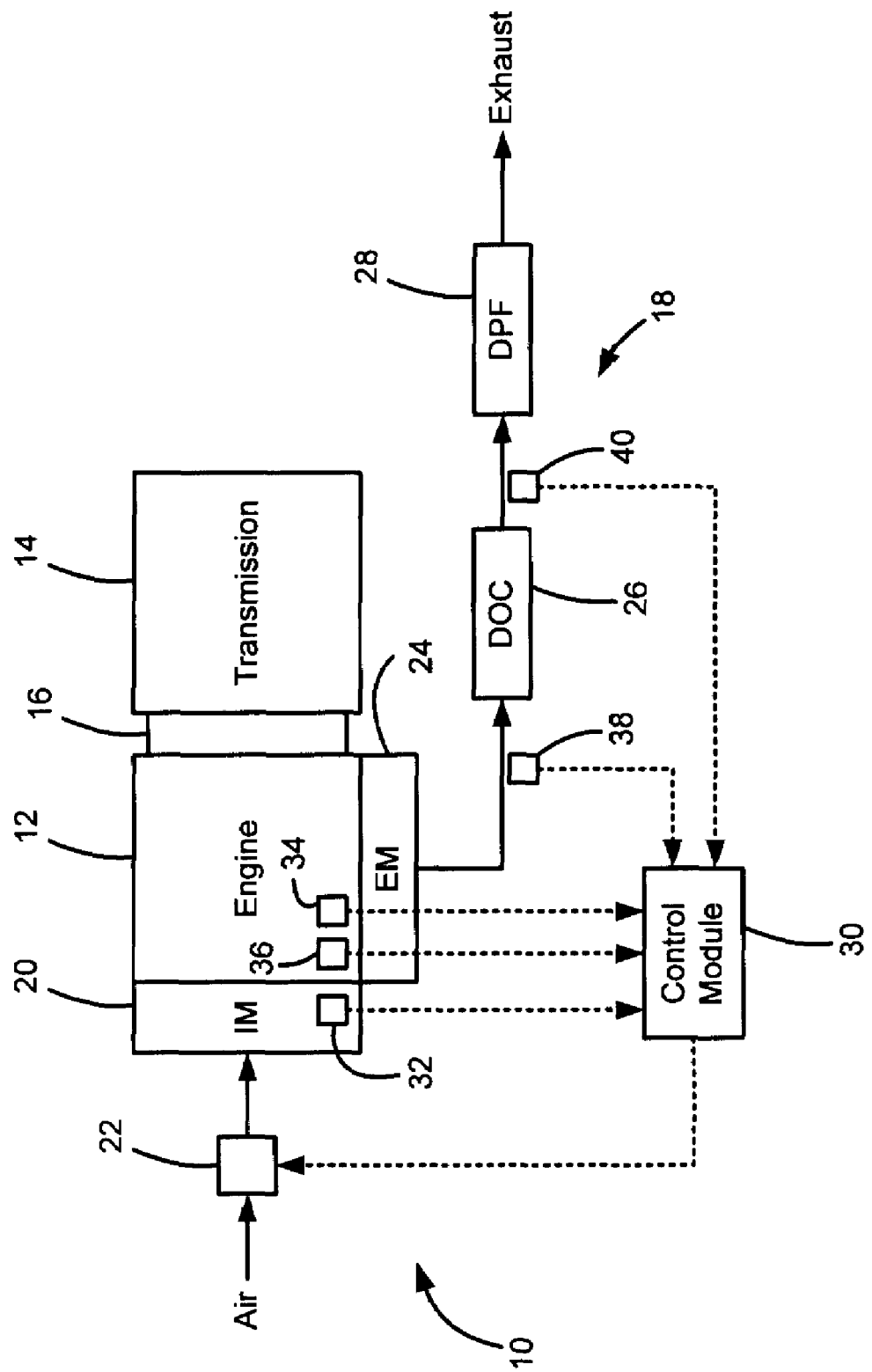
FIG. 1 is a schematic illustration of an engine system including an exhaust treatment system having a diesel oxidation catalyst (DOC) according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle 10 is illustrated including an engine 12 that drives a transmission 14 through a coupling device 16 (e.g., clutch, torque converter) and an exhaust treatment system 18. More specifically, air is drawn into an intake manifold 20 through a throttle 22. The intake manifold 20 distributes air into cylinders (not shown). The air is mixed with fuel and the air/fuel mixture is combusted within the cylinders to drive pistons (not shown), producing drive torque. Exhaust generated by the combustion process is exhausted from the engine 12 and into the exhaust treatment system 18 through an exhaust manifold 24.

The exhaust treatment system 18 includes a diesel oxidation catalyst (DOC) 26 and a diesel particulate filter (DPF) 28 that reduce emissions. More specifically, a catalyst layer of the DOC 26 induces reaction of the exhaust once the DOC 26 has achieved a threshold or light-off temperature ($T_{LO}$). Carbon monoxide, gaseous hydrocarbons and liquid hydrocarbon particles are oxidized over the catalyst layer to reduce emissions. The DPF 28 traps soot particles therein preventing the soot from escaping to atmosphere. The DPF 28 periodically undergoes a regeneration process, whereby the soot trapped therein is burned off.

A control module 30 regulates operation of the engine and executes the temperature sensor rationality control of the present invention. More specifically, the control module 30 regulates engine fueling and the throttle 22 to achieve a desired engine torque output based on signals generated by various sensors, as described herein.

A manifold absolute pressure (MAP) sensor 32 disposed within the intake manifold is responsive to MAP and generates a MAP signal based therein. An engine speed sensor 34 generates an engine speed (RPM) signal and a coolant temperature 36 sensor generates a coolant temperature ($T_{COOL}$) signal. The exhaust treatment system 18 includes a DOC inlet temperature sensor 38 and a DOC outlet temperature sensor 40. The inlet temperature sensor 38 generates an inlet temperature ($T_{IN}$) signal and the outlet temperature sensor 40 generates an outlet temperature ($T_{OUT}$) signal.

The temperature sensor rationality control of the present invention determines temperature accuracy after the exhaust temperature ($T_{EXH}$) has achieved a threshold temperature ($T_{THR}$) and is still below $T_{LO}$. $T_{EXH}$ is determined based on engine operating conditions and/or a thermal model, as discussed in detail below. The thermal model compensates for the temperature difference ($T_{DIFF}$) between $T_{IN}$ and $T_{OUT}$ caused by the thermal capacity of the DOC 26. More specifically, in order to compensate for the thermal capacity of the DOC 26, $T_{OUT}$ is compared to a delayed $T_{IN}$ ($T_{INDEL}$). $T_{INDEL}$ is determined from the following relationship:

$$T_{INDEL}(k) = T_{INDEL}(k-1) \times \alpha + (1-\alpha) \times T_{IN}$$

where k is the current time step, k−1 is the previous time step and α is a calibration factor determined from a look-up table based on an exhaust flow rate and a fueling rate.

The value of $T_{EXH}$, relative to $T_{THR}$ and $T_{LO}$, can be determined using various methods. In one method, engine operating parameters are compared to respective thresholds. If the engine operating parameters are each within their respective thresholds, $T_{EXH}$ is considered to be greater than $T_{THR}$ and less than $T_{LO}$. If any of the engine operating parameters outside of their respective thresholds, $T_{EXH}$ is considered to be either less than $T_{THR}$ or greater than $T_{LO}$. Exemplary engine operating conditions include, but are not limited to, engine running time, current fuel rate, exhaust mass flow, engine RPM, $T_{COOL}$, no sensor faults indicated, no DPF regeneration occurring and whether each of these conditions are met for a threshold period of time. For example, if the engine running time ($t_{RUN}$) exceeds a threshold running time ($t_{RUNTHR}$), the current fueling rate ($FR_{CURR}$) is within a threshold fueling rate range defined by lower and upper fueling rate thresholds ($FR_{LOTHR}$, $FR_{UPTHR}$), an exhaust mass flow ($m_{EXH}$) is within a threshold mass flow range defined by lower and upper thresholds ($m_{EXHLO}$, $m_{EXHUP}$), the engine RPM is within a threshold range defined by lower and upper thresholds ($RPM_{LOTHR}$, $RPM_{UPTHR}$), $T_{COOL}$ is within a threshold range defined by lower and upper thresholds ($T_{COOLLOTHR}$, $T_{COOLUPTHR}$), there are no sensor faults, there is no DPF regeneration occurring and the operating conditions are within their respective threshold for a threshold time, $T_{EXH}$ is considered to be within the range defined between $T_{THR}$ and $T_{LO}$.

It is alternatively anticipated that $T_{EXH}$ can be calculated as a function of engine operating conditions. Exemplary engine operating conditions include, but are not limited to, engine RPM, primary fuel rate, injection timing, turbo boost, post fuel rate, exhaust gas recirculation (EGR). An exemplary relationship is defined as:

$$T_{EXH} = [f(RPM, FR_{PRIM}, t_{INJ}, boost, FR_{POST}, EGR) + Offset] \times k_{AMB} \times k_{VEH}$$

where Offset is a temperature offset based on a learned function of the outlet temperature sensor, $k_{AMB}$ is an ambient condition factor based on an ambient temperature and $k_{VEH}$ is a vehicle condition factor based on vehicle speed and exhaust architecture. It is anticipated that the relationship can be modified to provide a maximum $T_{EXH}$ ($T_{EXHMAX}$) and/or a minimum $T_{EXH}$ ($T_{EXHMIN}$).

The temperature rationality diagnostic control determines the accuracy of the temperature sensors 38, 40 and can detect a failed sensor or unintended DOC reaction based on $T_{DIFF}$. $T_{IN}$ and $T_{OUT}$ are compared to $T_{EXH}$. If either $T_{IN}$ or $T_{OUT}$ are within a threshold range of $T_{EXH}$, the sensors are operating normally. If either $T_{IN}$ or $T_{OUT}$ are outside of the threshold range of $T_{EXH}$, the sensors are faulty. Alternatively, if $T_{DIFF}$ is below a threshold difference ($T_{DIFFTHR}$), the sensors are operating correctly. If $T_{DIFF}$ is below $T_{DIFFTHR}$, the sensors are faulty.

Figure 2:
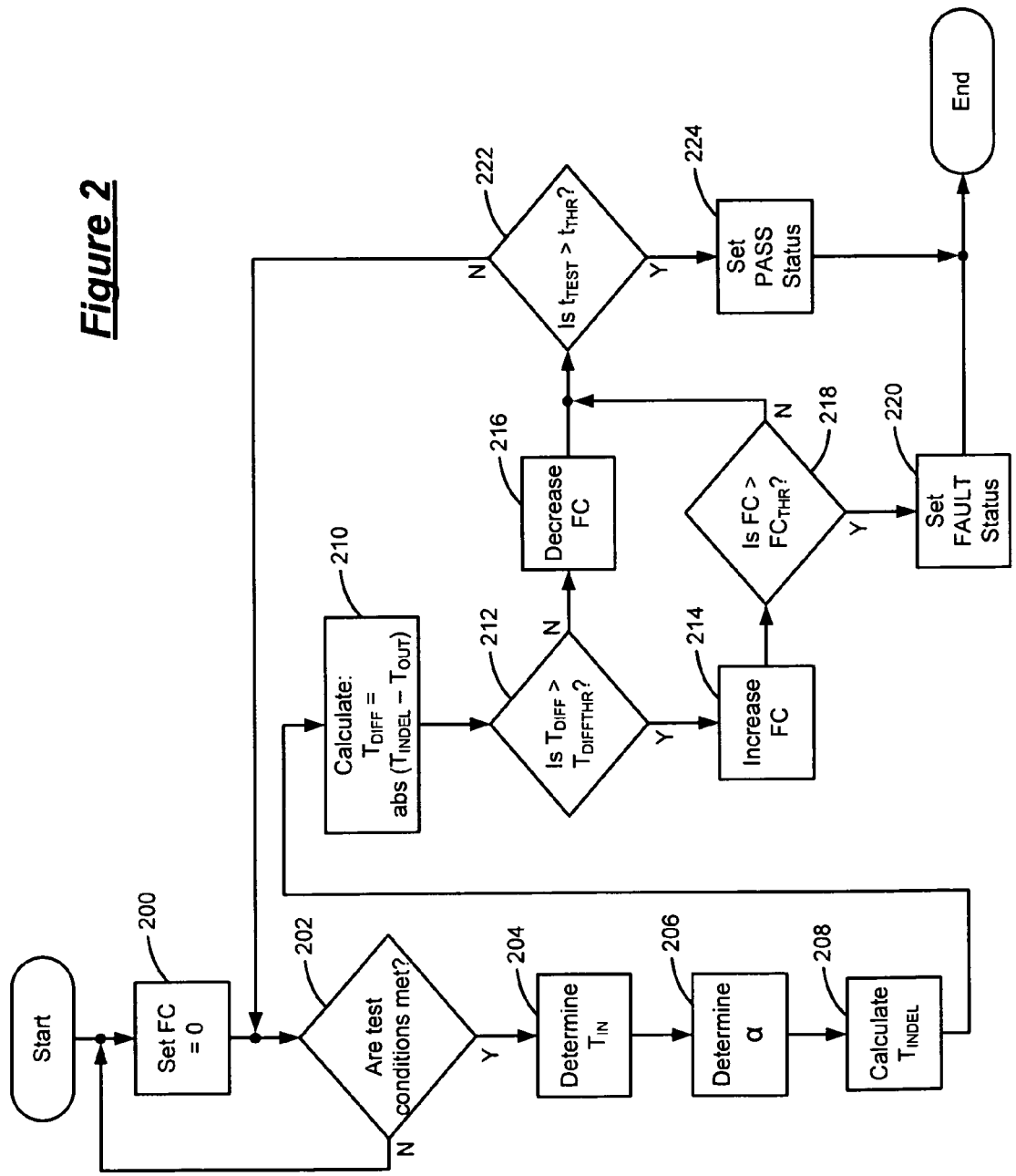
FIG. 2 is a flowchart illustrating exemplary steps executed by the temperature sensor rationality control of the present invention.

Referring now to FIG. 2, exemplary steps executed by the temperature sensor rationality control will be described in detail. In step 200, control sets a fault count (FC) equal to zero. In step 202, control determines whether test conditions are met. As described in detail above, the test conditions include $T_{EXH}$ being within a threshold range defined by $T_{THR}$ and $T_{LO}$ and/or engine operating conditions being met that would indicate $T_{EXH}$ is within the threshold range. If the test conditions are met, control continues in step 204. If test conditions are not met, control loops back.

In step 204, control determines $T_{IN}$ based on the inlet temperature sensor signal. In step 206, control determines α based on exhaust flow rate and fueling rate. Control determines $T_{INDEL}$ based on $T_{IN}$, a previous $T_{INDEL}$ and α in step 208. In step 210, control determines $T_{DIFF}$ as the absolute value of the difference of $T_{INDEL}$ and $T_{OUT}$.

In step 212, control determines whether $T_{DIFF}$ exceeds $T_{DIFFTHR}$. If $T_{DIFF}$ exceeds $T_{DIFFTHR}$, control continues in step 214. If $T_{DIFF}$ does not exceed $T_{DIFFTHR}$, control continues in step 216. In step 214, control increases FC. In step 218, control determines whether FC exceeds a threshold FC ($FC_{THR}$). If FC exceeds $FC_{THR}$, control sets a FAULT status in step 220 and control ends. If FC does not exceed $FC_{THR}$, control continues in step 222. Control determines whether a test time ($t_{TEST}$) exceeds a test time threshold ($t_{THR}$) in step 222. If $t_{TEST}$ exceeds $t_{THR}$, control sets a PASS status in step 224 and control ends. If $t_{TEST}$ does not exceed $t_{THR}$, control loops back to step 202.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A temperature sensor control system for an exhaust treatment system of a vehicle having an oxidation catalyst, comprising:
   an oxidation catalyst inlet temperature sensor that generates an inlet temperature signal;

an oxidation catalyst outlet temperature sensor that generates an outlet temperature signal; and a control module that determines a delayed inlet temperature value based on at least one of a calibration factor, a previous delayed inlet temperature value and said inlet temperature signal and determines whether a difference based on said delayed inlet temperature signal and said outlet temperature signal is below a difference threshold when an exhaust temperature is greater than a first threshold temperature and is less than a second threshold temperature.

2. The temperature sensor control system of claim 1 wherein said exhaust temperature is calculated based on at least one of an engine RPM, a primary fuel rate, an injection timing, a turbo boost level, a post fuel rate and an exhaust gas recirculation (EGR) value.

3. The temperature sensor control system of claim 1 wherein said calibration factor is determined from a look-up table based on an exhaust flow rate and a fueling rate.

4. The temperature sensor control system of claim 1 wherein said exhaust temperature is greater than said first threshold temperature and is less than said second threshold temperature when a plurality of vehicle operating parameters are within respective threshold ranges.

5. The temperature sensor control system of claim 4 wherein said vehicle operating parameters include engine running time, current fuel rate, exhaust mass flow, engine RPM, coolant temperature and no DPF regeneration occurring.

6. The temperature sensor control system of claim 4 wherein said exhaust temperature is greater than said first threshold temperature and is less than said second threshold temperature when a plurality of vehicle operating parameters are within said respective threshold ranges for a threshold period of time.

7. A method of determining a status of a temperature sensor of an exhaust treatment system of a vehicle having an oxidation catalyst, comprising:

generating an inlet temperature signal at an oxidation catalyst inlet using an inlet temperature sensor;

generating an outlet temperature signal at an oxidation catalyst outlet using an outlet temperature sensor;

generating a delayed inlet temperature value based on at least one of a calibration factor, a previous delayed inlet temperature value and said inlet temperature signal;

calculating a difference based on said delayed inlet temperature signal and said outlet temperature signal; and determining a status of said inlet and outlet temperature sensors based on said difference when an exhaust temperature is greater than a first threshold temperature and is less than a second threshold temperature.

8. The method of claim 7 further comprising indicating a fault status when said difference is below a difference threshold.

9. The method of claim 7 wherein said exhaust temperature is calculated based on at least one of an engine RPM, a primary fuel rate, an injection timing, a turbo boost level, a post fuel rate and an exhaust gas recirculation (EGR) value.

10. The method of claim 7 wherein said calibration factor is determined from a look-up table based on an exhaust flow rate and a fueling rate.

11. The method of claim 7 further comprising determining whether a plurality of vehicle operating parameters are within respective threshold ranges, wherein said exhaust temperature is greater than said first threshold temperature and is less than said second threshold temperature when said plurality of vehicle operating parameters are within said respective threshold ranges.

12. The method of claim 11 wherein said vehicle operating parameters include engine running time, current fuel rate, exhaust mass flow, engine RPM, coolant temperature and no DPF regeneration occurring.

13. The method of claim 11 wherein said exhaust temperature is greater than said first threshold temperature and is less than said second threshold temperature when said plurality of vehicle operating parameters are within said respective threshold ranges for a threshold period of time.

14. A method of diagnosing an operating condition of a temperature sensor of an exhaust treatment system of a vehicle having an oxidation catalyst, comprising:

generating an inlet temperature signal at an oxidation catalyst inlet using an inlet temperature sensor;

generating an outlet temperature signal at an oxidation catalyst outlet using an outlet temperature sensor;

determining a delayed inlet temperature signal based on said inlet temperature signal and characteristics of said oxidization catalyst;

calculating a difference based on said delayed inlet temperature signal and said outlet temperature signal; and determining a status of said inlet and outlet temperature sensors based on said difference when an exhaust temperature is greater than a first threshold temperature and is less than a second threshold temperature.

15. The method of claim 14 wherein said exhaust temperature is calculated based on at least one of an engine RPM, a primary fuel rate, an injection timing, a turbo boost level, a post fuel rate and an exhaust gas recirculation (EGR) value.

16. The method of claim 14 wherein said delayed inlet temperature value is determined based on at least one of a calibration factor, a previous delayed inlet temperature value and said inlet temperature signal.

17. The method of claim 16 wherein said calibration factor is determined from a look-up table based on an exhaust flow rate and a fueling rate.

18. The method of claim 14 further comprising indicating a fault status when said difference is below a difference threshold.

19. The method of claim 18 further comprising determining whether a plurality of vehicle operating parameters are within respective threshold ranges, wherein said exhaust temperature is greater than said first threshold temperature and is less than said second threshold temperature when said plurality of vehicle operating parameters are within said respective threshold ranges.

20. The method of claim 19 wherein said vehicle operating parameters include engine running time, current fuel rate, exhaust mass flow, engine RPM, coolant temperature and no DPF regeneration occurring.

21. The method of claim 19 wherein said exhaust temperature is greater than said first threshold temperature and is less than said second threshold temperature when said plurality of vehicle operating parameters are within said respective threshold ranges for a threshold period of time.

* * * * *